US008609752B2

(12) United States Patent
Bowen, III

(10) Patent No.: US 8,609,752 B2
(45) Date of Patent: Dec. 17, 2013

(54) ASPHALTENES-BASED POLYMER NANO-COMPOSITES

(75) Inventor: Daniel E. Bowen, III, Olathe, KS (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 0 days.

(21) Appl. No.: 13/422,792

(22) Filed: Mar. 16, 2012

(65) Prior Publication Data

US 2012/0238669 A1    Sep. 20, 2012

Related U.S. Application Data

(60) Provisional application No. 61/453,579, filed on Mar. 17, 2011.

(51) Int. Cl.
*C08L 95/00* (2006.01)

(52) U.S. Cl.
USPC .......................................................... 524/64

(58) Field of Classification Search
USPC ................................................ 524/59, 64, 69
See application file for complete search history.

(56) References Cited

U.S. PATENT DOCUMENTS

| | | | |
|---|---|---|---|
| 5,227,101 A | 7/1993 | Mahoney et al. | |
| 5,652,284 A | 7/1997 | Eidt, Jr. et al. | |
| 5,738,691 A | 4/1998 | Barker et al. | |
| 5,998,513 A * | 12/1999 | Hashimoto | 524/64 |
| 6,007,588 A | 12/1999 | Mitchell | |
| 6,063,899 A | 5/2000 | Johnson et al. | |
| 7,022,200 B2 | 4/2006 | Tayebi | |
| 7,855,243 B2 | 12/2010 | Kanz et al. | |
| 7,897,667 B2 | 3/2011 | Mabry et al. | |
| 7,956,095 B2 | 6/2011 | Sanchez et al. | |
| 7,968,660 B2 | 6/2011 | Dubois et al. | |
| 7,985,394 B2 | 7/2011 | Duvall | |
| 2006/0252329 A1 | 11/2006 | Nahmias et al. | |
| 2008/0280999 A1 | 11/2008 | Lakshman | |
| 2009/0203805 A1 | 8/2009 | Sanchez et al. | |
| 2010/0179245 A1* | 7/2010 | Guzman et al. | 523/122 |
| 2010/0317777 A1 | 12/2010 | Bowen, III et al. | |
| 2011/0046253 A1 | 2/2011 | Bowen, III et al. | |
| 2011/0293057 A1 | 12/2011 | Bowen, III et al. | |
| 2012/0043483 A1 | 2/2012 | Bowen, III et al. | |

FOREIGN PATENT DOCUMENTS

| | | |
|---|---|---|
| CN | 101786611 | 7/2010 |
| EP | 721000 | 7/1996 |
| EP | 2203492 | 4/2009 |
| JP | 2000-218154 | 8/2000 |
| WO | 0134685 | 5/2001 |
| WO | 2007127906 | 11/2007 |
| WO | 2011119494 | 9/2011 |

OTHER PUBLICATIONS

Priyanto et al., "Measurement of property relationships of nano-structure micelles and coacervates of asphaltene in a pure solvent," Chemical Engineering Science, 56, 2001, 6933-6939.

Nassar et al., "Metal Oxide Nanoparticles for Asphaltene Adsorption and Oxidation," Energy & Fuels, vol. 25, Issue 3, 2011, 1017-1023.
"Controlled Polymer Property Manipulation via Nano and Other Technologies," 46th-39th Joint Regional ACS Meeting, Oct. 20, 2011, Bartow et al., National Nuclear Security Administration's Kansas City Plant.
"Controlled Polymer Property Manipulation via Nano and Other Technologies," 56th Annual Pentasectional Meeting ACS—Northeastern Oklahoma Section, Mar. 12, 2011, Eastwood et al., National Nuclear Security Administration's Kansas City Plant.
DiNunzio "Applications of KinetiSol® dispersing for the production of plasticizer free amorphous solid dispersions". European Journal of Pharmaceutical Sciences. Jun. 14, 2010 (vol. 40, Issue 3), pp. 179-187,http://www.sciencedirect.com/science/article/pii/S0928098710000850 (abstract only submitted).
Qin "Plasticizer-Free Polymer Membrane Ion-Selective Electrodes Containing a Methacrylic Copolymer Matrix". Electroanalysis, (vol. 14) pp. 1375-1381. Nov. 5, 2002, http://onlinelibrary.wiley.com/doi/10.1002/1521-4109(200211)14:19/20%3C1375::AID-ELAN1375%3E3.0.CO;2-8/abstract (abstract only submitted).
Mandaogade "Rosin Derivatives: Novel Film Forming Materials for Controlled Drug Delivery". Reactive and Functional Polymers, (vol. 50, Issue 3), pp. 233-242. Feb. 2002, ttp://www.sciencedirect.com/science/article/pii/S1381514801001171 (abstract only submitted).
Yakubovich "Is There a Need for Plasticizer-Free Biomaterials in Dialysis Therapy?". Med Device Technol, (10): pp. 12-13, 18-21. Dec. 2000, http://www.ncbi.nlm.nih.gov/pubmed/11200152 (abstract only submitted).
The Safety of Medical Devices Containing DEHP-Plasticized PVC or Other Plasticizers on Neonates and Other Groups Possibly at Risk. Scientific Committee on Emerging and Newly-Identified Health Risk. Feb. 6, 2008, http://ec.europa.eu/health/ph_risk/committees/04_scenihr/docs/scenihr/_o_014.pdf.
Sathyanarayana "Baby Care Products: Possible Sources of Infant Phthalate Exposure." Pediatrics. (vol. 121) pp. 260-268. Feb. 1, 2008, http://pediatrics.aappublications.org/content/121/2/e260.full (abstract only submitted).
Market Study: Plasticizers (UC-2205), Ceresana Research, May 2011, http://www.ceresana.com/en/market-studies/additives/plasticizers-new.
Campbell "End of Slow Death by Rubber Duck?" EnviroLaw. Jan. 17, 2011 http://envirolaw.com/slow-death-rubber-duck (abstract only submitted).
Walsh "European Commission's Proposed Ban on Plasticizers can Affect U.S. Market for Consumer Products." Pepper Hamilton, LLP. Oct. 31, 2011, http://www.pepperlaw.com/publications_update.aspx?ArticleKey=2218.
Emanuel "Plasticizer Market Update," BASF Corp. 22nd Annual Vinyl Compounding Conference. Jul. 10-13, 2011. http://spi.files.cms-plus.com/about/VPD/Tuesday%201.%20Calvin%20Emmanual-%20BASF%20%3D%Global%20Plasticizer%20Update.pdf.
Plasticizers Market Data. Arbeitsgemeinschaft PVC and Umwelt EV. http://www.pvc-partner.com/fileadmin/user_upload/downloads/Weichmacher/Markdaten_Weichmacher_230106.lin_en.pdf.

* cited by examiner

*Primary Examiner* — Peter Szekely
(74) *Attorney, Agent, or Firm* — Hovey Williams LLP

(57) ABSTRACT

Inventive composite materials are provided. The composite is preferably a nano-composite, and comprises an asphaltene, or a mixture of asphaltenes, blended with a polymer. The polymer can be any polymer in need of altered properties, including those selected from the group consisting of epoxies, acrylics, urethanes, silicones, cyanoacrylates, vulcanized rubber, phenol-formaldehyde, melamine-formaldehyde, urea-formaldehyde, imides, esters, cyanate esters, allyl resins.

30 Claims, 4 Drawing Sheets
(4 of 4 Drawing Sheet(s) Filed in Color)

ASPHALTENES-BASED POLYMER NANO-COMPOSITES

RELATED APPLICATIONS

The present application claims the priority benefit of U.S. Provisional Patent Application Ser. No. 61/453,579, filed Mar. 17, 2011, entitled CONTROLLED LOWERING OF A POLYMER'S GLASS TRANSITION TEMPERATURE WITHOUT THE USE OF PLASTICIZERS, incorporated by reference in its entirety herein.

GOVERNMENT FUNDING

The present invention was developed with support from the U.S. government under a contract with the United States Department of Energy, Contract No. DE-NA0000622. Accordingly, the U.S. government has certain rights in the present invention.

BACKGROUND OF THE INVENTION

1. Field of the Invention

The present invention is broadly concerned with composites comprising a mixture of one or more asphaltenes with a polymer.

2. Description of the Prior Art

Nano-composites based on nano-fillers are highly desirable because they can possess unique and/or unusual properties not otherwise easily obtainable. Unfortunately, many nano-fillers are very expensive, making nano-composites formed from them likewise expensive.

Asphalt is a crude and inexpensive material, and is a by-product of petroleum relining. It's low in cost, and has been used for extremely high volume applications, the most important of which is road construction. Asphaltenes are a distinct chemical component of asphalt, which can be isolated based on solubility by solvent extraction and other methods. In general, asphaltenes are large, planar, aromatic, hetero-atom containing compounds that lend themselves to pi-pi stacking.

SUMMARY OF THE INVENTION

The present invention provides a lower-cost composite, and preferably nano-composite, material. In one embodiment, a composite comprising a polymer mixed with an asphaltene is provided. The invention also provides a method of forming a composite by mixing an asphaltene with a polymer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
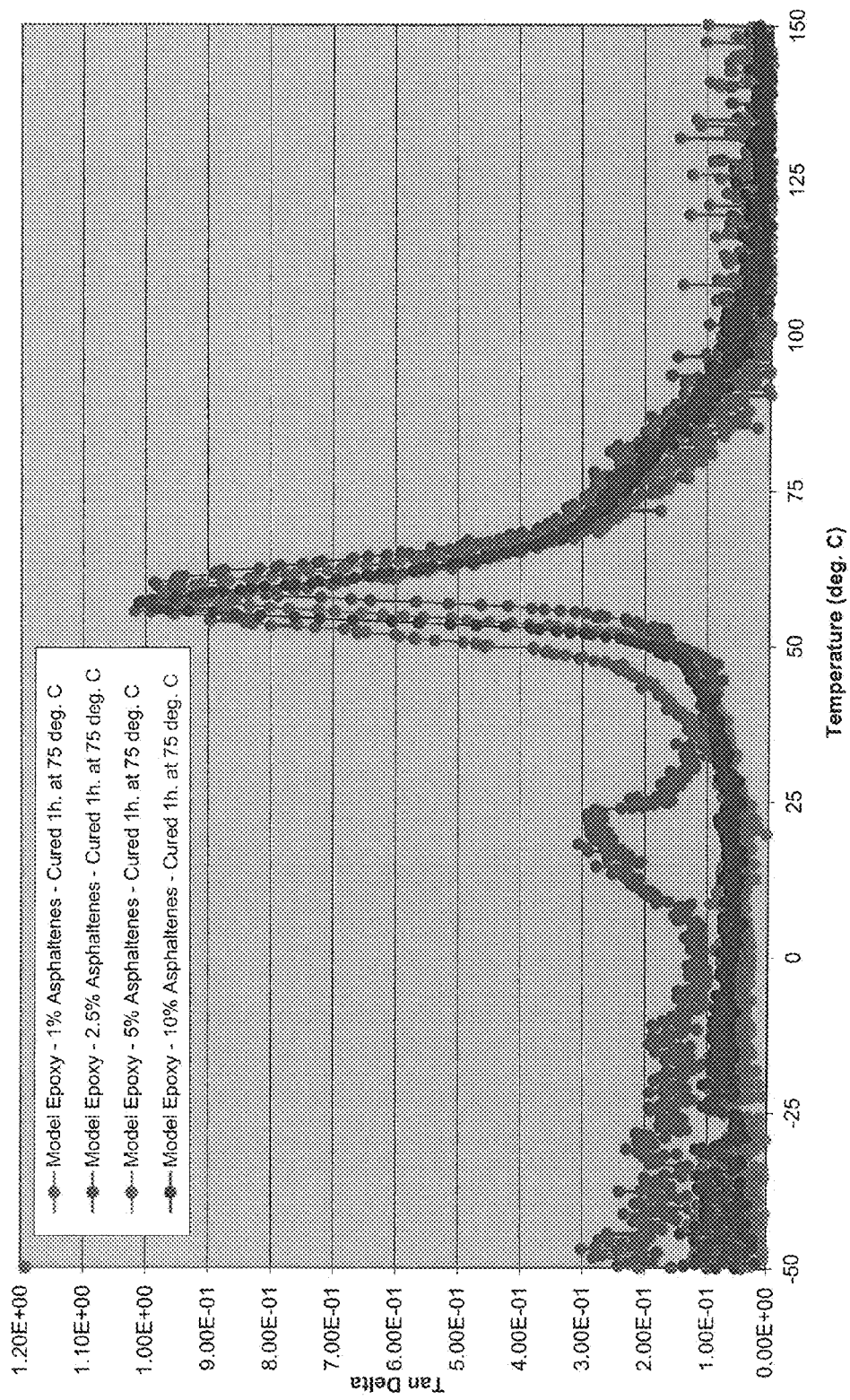
FIG. 1 is a graph showing the rheology of the sample prepared in Example 1.

The composites of the present invention are preferably nano-composites and comprise a polymer mixed with an asphaltene (preferably a plurality of asphaltenes). In a preferred embodiment, the polymer present in the composite forms a polymer matrix. This can be accomplished purely by virtue of the structure of the polymer itself. Or, in another embodiment, the polymer is crosslinked or cured, so that the polymer matrix comprises a crosslinked polymer. The asphaltene(s) may be physically dispersed (i.e., no chemical reactions between the asphaltene and the polymer) within that polymer matrix, chemically reacted with the polymer, or a combination of both.

Preferred polymers include those selected from the group consisting of epoxies, acrylics, urethanes, silicones, cyanoacrylates, rubber, phenol-formaldehyde, melamine-formaldehyde, urea-formaldehyde, imides, esters, cyanate esters, allyl resins, and mixtures thereof. More preferably, the polymer is a crosslinked or cured polymer of the foregoing. It is preferred that the composite comprises from about 60% to about 99.9% by weight polymer, more preferably from about 70% to about 99.5% by weight polymer, and more preferably from about 80% to about 99% by weight polymer, based upon the total weight of the composite taken as 100% by weight.

Preferred asphaltenes are highly aromatic, planar molecules, and have the ability to pi stack. They are preferably derived from asphalt, bitumen, and/or crude oil. Any method of deriving the asphaltene(s) from the asphalt, bitumen, and/or crude oil is suitable for purposes of this invention. The preferred asphaltenes are insoluble in n-pentane or n-heptane at a dilution ratio of 40 parts alkane to 1 part asphalt, bitumen, and/or crude oil, and they will preferably dissolve in toluene at the same dilution ratio. Furthermore, preferred asphaltenes will have a hydrogen to carbon (H/C) ratio of less than about 1.40, preferably less than about 1.35, and more preferably less than about 1.30 (as determined by elemental analysis). Some asphaltenes that could be used with the present invention may have a structure (or may include a portion having a structure) selected from the group consisting of 3
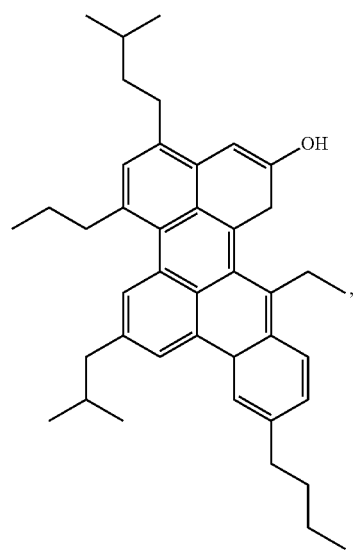
4
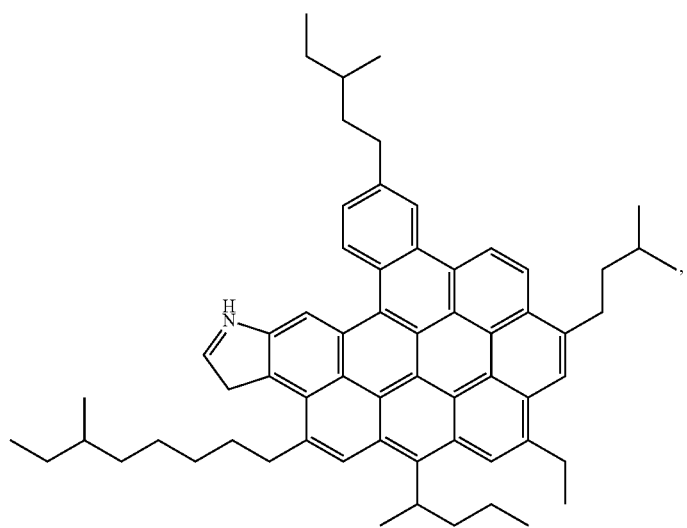
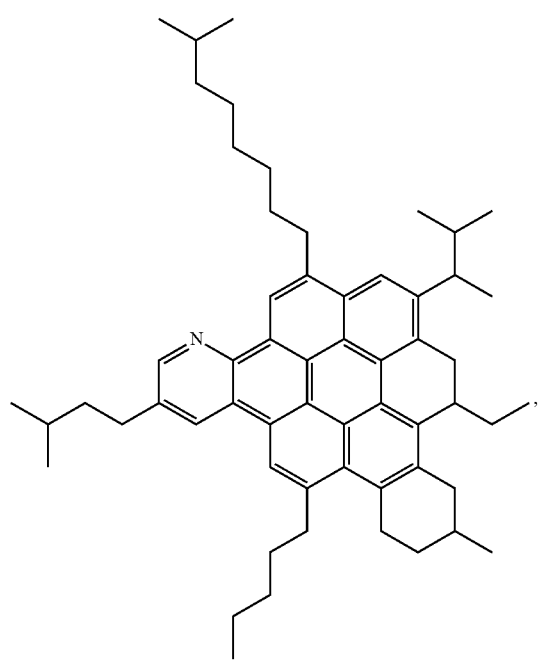
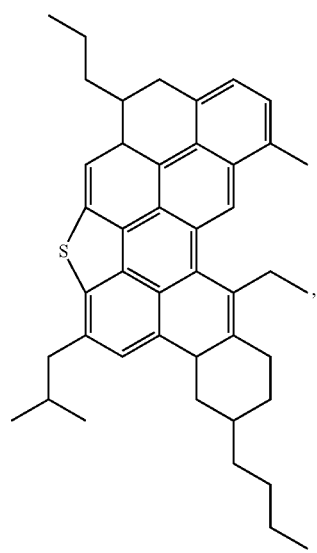

-continued
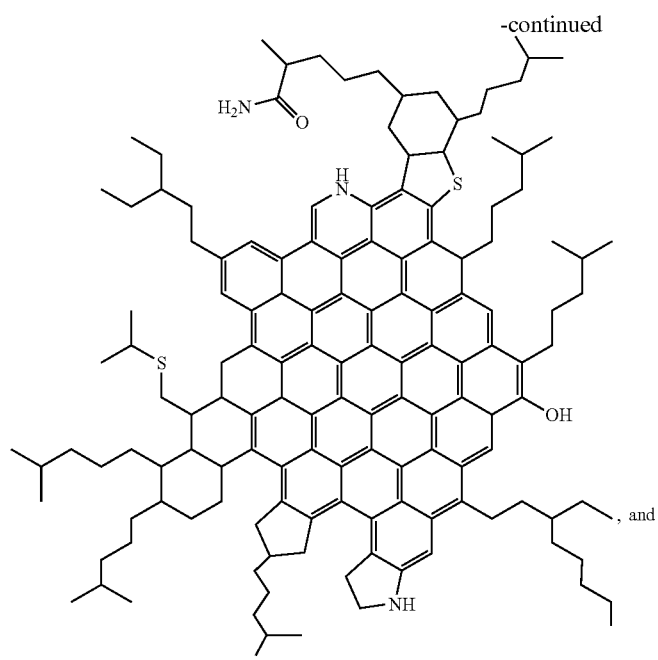
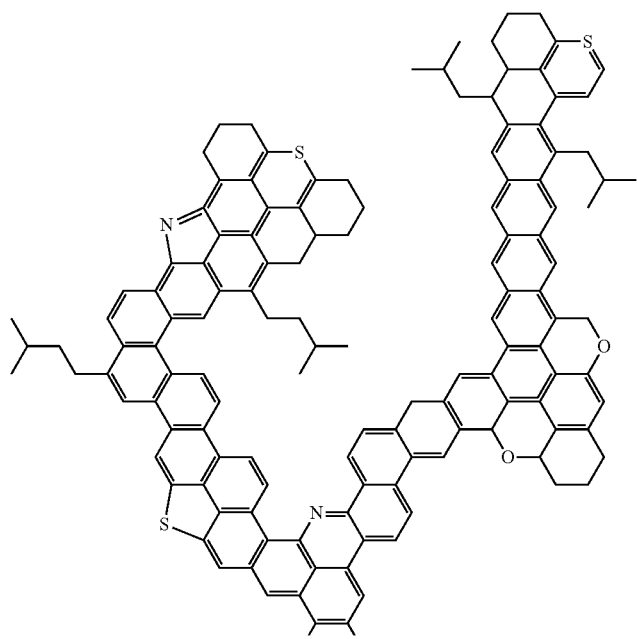

-continued

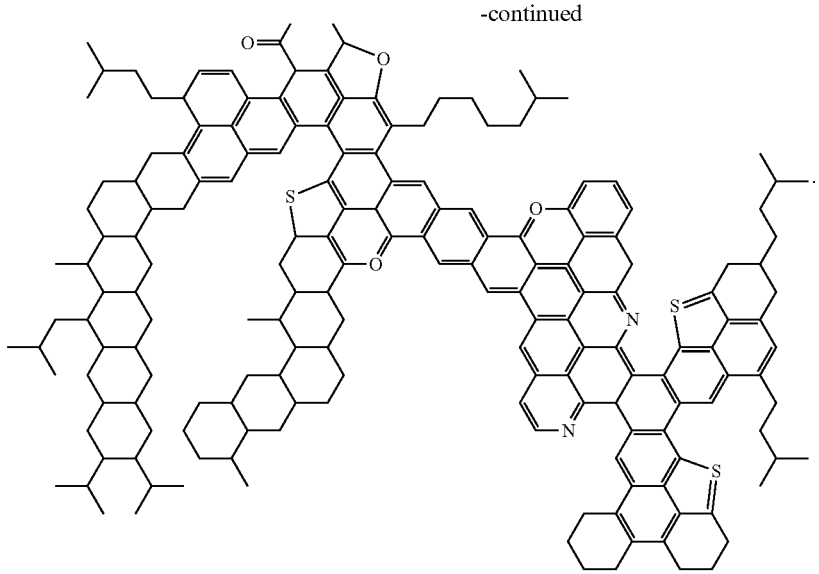

It is preferred that the composite comprise from about 0.1% to about 40% by weight asphaltene, more preferably from about 0.5% to about 30% by weight asphaltene, and more preferably from about 1% to about 20% by weight asphaltene, based upon the total weight of the composite taken as 100% by weight.

The composites can also comprise other ingredients. For example, a solvent may be used during formation of the composite, and residual solvent may remain in the composite. A curing or crosslinking agent may have been utilized to crosslink the polymer. In such instances, the crosslinking agent will generally be crosslinked with the polymer, although there may be unreacted crosslinking agent remaining in the composite.

A curing or crosslinking catalyst may have also been utilized, depending upon the particular polymer utilized. The catalyst will effect self crosslinking of the polymer and/or crosslinking of the polymer with the crosslinking agent.

A solvent could also be utilized to assist in dispersing the asphaltene within the polymer. Examples of suitable solvents and their respective boiling points include those selected from the group consisting of acetic acid (118° C.), acetic acid anhydride (139° C.), acetone (56.3° C.), acetonitrile (81.6° C.), benzene (80.1° C.), iso-butanol (107.7° C.), n-butanol (117.7° C.), tert-butanol (82.5° C.), carbon tetrachloride (76.5° C.), chlorobenzene (131.7° C.), chloroform (61.2° C.), cyclohexane (80.7° C.), cyclopentane (49.3° C.), dichloromethane (39.8° C.), dioxane (101° C.), ethanol (78.3° C.), ethyl acetate (77.1° C.), ethylene dichloride (83.5° C.), heptane (98.4° C.), n-hexane (68.7° C.), hydrochloric acid (84.8° C.), methyl ethyl ketone (79.6° C.), methanol (64.7° C.), methyl tert-butyl ether (55.2° C.), iso-propanol (82.3° C.), n-propanol (97.2° C.), pyridine (115.3° C.), tetrahydrofuran (66° C.), toluene (110.6° C.), trifluoroacetic acid (71.8° C.), water (100° C.), dimethyl acetamide (166.1° C.), dimethyl formamide (153° C.), pentane (36.1° C.), diethyl ether (34.6° C.), dimethyl sulfoxide (189° C.), ethyl ether (34.6° C.), ethylene glycol (197.5° C.), petroleum ether (35-60° C.), and mixtures thereof.

Other ingredients that may be present include those selected from the group consisting of fillers, plasticizers, process aids, accelerators, modifiers, processing oils, pigments and dyes, extenders, and combinations of the foregoing.

In one embodiment, the composite consists essentially of, or even consists of, the polymer and asphaltene. In either instance, there may be residual solvent remaining, unreacted crosslinking agent present, and/or catalyst present.

The inventive composites are fainted by simply mixing the desired polymer with the asphaltene. It is preferred that the weight ratio of polymer to asphaltene in the composite is from about 60:40 to about 99.9:0.1, more preferably from about 70:30 to about 99.5:0.5, and even more preferably from about 80:20 to about 99:1.

The solvent could be mixed with the polymer and asphaltene simultaneously, or it could be mixed with only one of the two, followed by addition of the other of the two. For polymers that comprise two or more components that are mixed and cured, the solvent could be mixed with one or more of the individual components and/or asphaltene individually, or with each component/ingredient. Likewise, solvent may be added to the asphaltene, which is then added to one or more of the individual components, which are then added with each other. Any other ingredients (such as those listed above) can also be mixed in at any time. The solvent will typically be added at levels of from about 0.1% by weight to about 45% by weight, preferably from about 0.5% by weight to about 35% by weight, and more preferably from about 1% by weight to about 25% by weight, based upon the total weight of all ingredients in composition taken as 100% by weight.

In situations where a conventional crosslinking agent is utilized, it is typically added at levels of from about 1% by weight to about 25% by weight, and more preferably from about 2% by weight to about 15% by weight, based upon the total weight of the polymer taken as 100% by weight. Furthermore, if a catalyst is utilized, it will typically be added at levels of from about 1% by weight to about 10% by weight, and more preferably from about 2% by weight to about 5% by weight, based upon the total weight of polymer taken as 100% by weight.

In other instances, the "crosslinking agent" will function more like a comonomer, reacting with the polymer described above in sufficiently large quantities that the comonomer/ crosslinking agent is present at much higher levels than would be the case for a conventional crosslinking agent. That is, the comonomer/crosslinking agent would be included in quantities approximately equal to the quantities of the polymer utilized (e.g., the ratio of comonomer to polymer would be from about 40:60 to about 60:40, and preferably from about 45:55 to about 55:45). In these instances, the total weight of comonomer plus polymer present in the composite would equal the percentages set forth above with respect to the polymer.

The resulting mixture is then heated to cause evaporation of any solvent that may be present, as well as to effect crosslinking of the polymer, in instances where a crosslinked polymer is desired (or copolymerization, as discussed above). Heating temperatures and times will depend upon many factors, including the boiling point of the solvent, the catalyst utilized, the crosslinking temperature of the polymer, etc. However, typical temperatures will be from about 25° C. to about 300° C., preferably from about 30° C. to about 250° C., and more preferably from about 35° C. to about 200° C. Typical time periods are from about 30 minutes to about 48 hours and preferably from about 1 hour to about 16 hours.

The resulting composite will comprise a polymer matrix having the asphaltene(s) dispersed therein. It will be appreciated that the above invention can be utilized to alter various properties of the particular polymer selected. Furthermore, the properties to be altered can be determined by selection of the particular polymer, asphaltene loading within that polymer, crosslinking agent utilized, other ingredients present, etc.

EXAMPLES

The following examples set forth preferred methods in accordance with the invention. It is to be understood, however, that these examples are provided by way of illustration and nothing therein should be taken as a limitation upon the overall scope of the invention.

Asphaltene Extraction

Asphaltenes were separated from asphalt by dissolving 1 g, using ~40 g (~64 mL) of n-pentane per gram of asphalt. The mixture was stirred and brought to reflux (low boil) while stirring for 1 hour. The mixture was then allow to cool to about 25° C. The solid/insoluble fraction was separated from the liquid/soluble fraction, dissolved in toluene, and filtered. The collected solids were asphaltenes, which were subjected to the same extraction procedure again. The final asphaltene solids were oven dried under vacuum at a temperature greater than the boiling point of toluene.

Example 1

Asphaltenes (extracted from SemMaterials Total Pen 30 asphalt) were mixed under ambient conditions with an epoxy polymer (EPON 828; Epoxy Equivalent Weight of 185-192; obtained from Hexion) and an amine curing or crosslinking agent (EPICURE 3270; Amine Equivalent Weight of 142; obtained from Hexion). The respective quantities of each ingredient are shown in Table 1. The samples were then cured at 75° C. for 1 hour.

TABLE 1

| Sample # | Asphaltene[A] | Asphaltene (g) | Epoxy Polymer (g) | Amine Curing Agent (g) |
|---|---|---|---|---|
| 1 | 0 | 0 | 8.57 | 6.43 |
| 2 | 1 | 0.15 | 8.49 | 6.37 |
| 3 | 2.5 | 0.38 | 8.36 | 6.27 |
| 4 | 5 | 0.75 | 8.15 | 6.11 |
| 5 | 10 | 1.50 | 7.72 | 5.79 |

[A]% by weight, based upon the total weight of composition taken as 100% by weight.

The rheology of these samples was tested and is reported in FIG. 1. There was no change in $T_g$ at any loading.

Example 2

Asphaltenes (extracted from SemMaterials Total Pen 30 asphalt) were mixed under ambient conditions with EPON 828, tetrahydrofuran (THF), and EPICURE 3270. The respective quantities of each ingredient are shown in Table 2. The samples were cured for 5 hours (5 h) followed by 5 hours under vacuum (5 hVac) at 110° C.

TABLE 2

| Sample # | Asphaltene[A] | Asphaltene (g) | THF[A] | THF (g) | Epoxy Polymer (g) | Amine Curing Agent (g) |
|---|---|---|---|---|---|---|
| 1 | 0 | 0 | 12 | 2.00 | 8.57 | 6.43 |
| 2 | 1 | 0.15 | 12 | 2.00 | 8.49 | 6.37 |
| 3 | 2.5 | 0.38 | 14.3 | 2.50 | 8.36 | 6.27 |
| 4 | 5 | 0.75 | 19 | 3.50 | 8.15 | 6.11 |

[A]% by weight, based upon the total weight of composition taken as 100% by weight.

Figure 2:
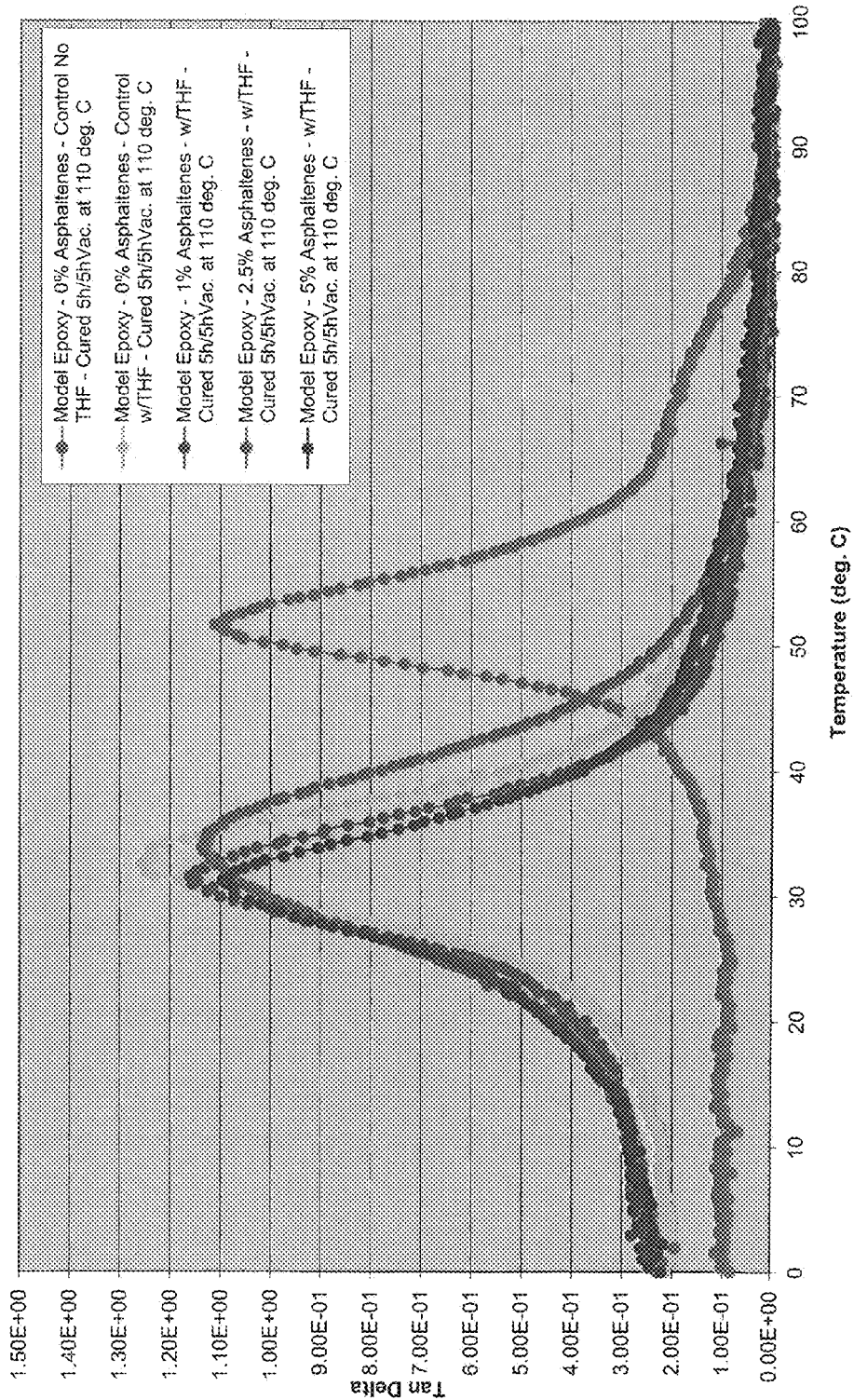
FIG. 2 is a graph depicting the rheology of the sample prepared in Example 2.
Figure 3:
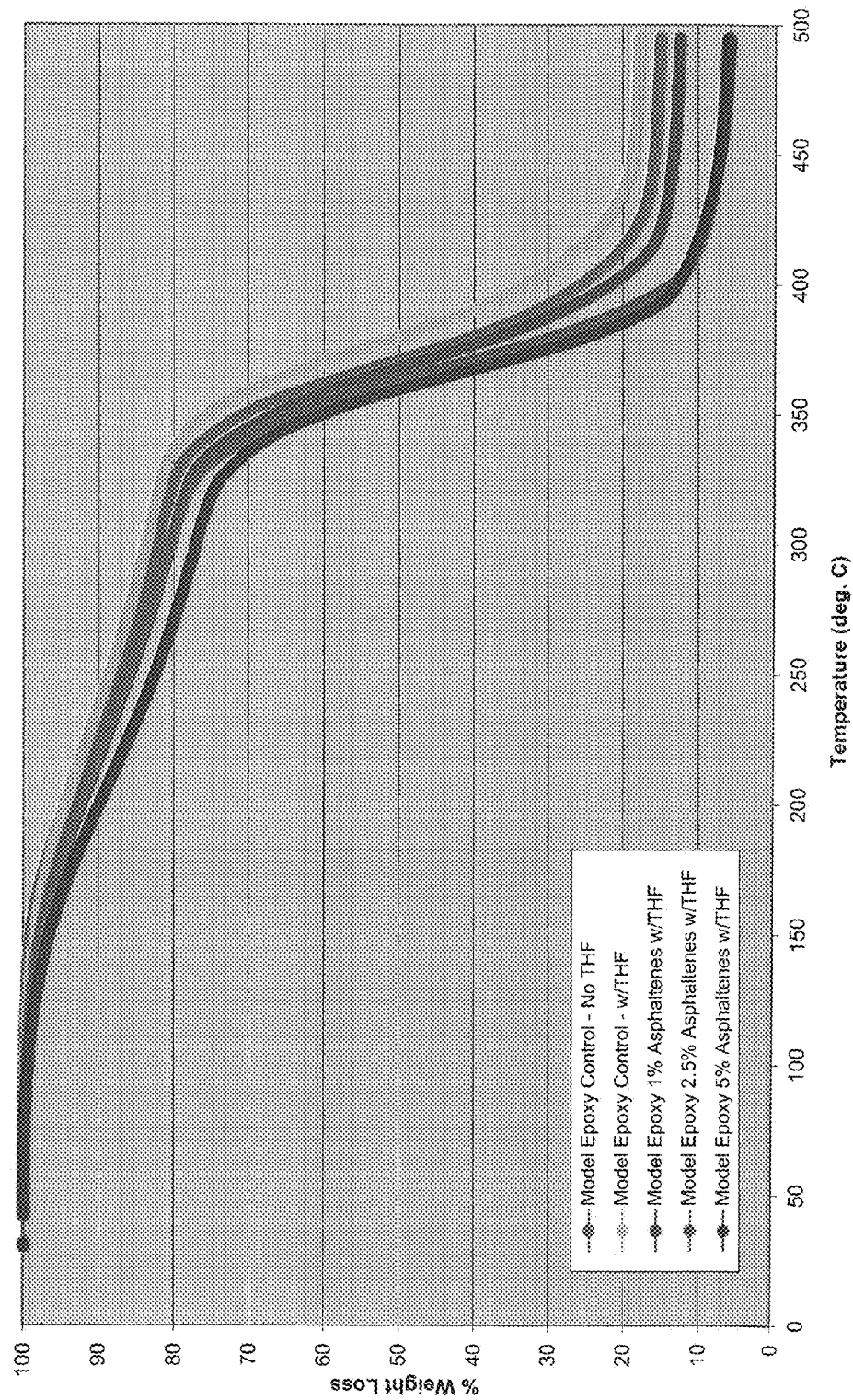
FIG. 3 is a graph showing the thermogravimetric analysis of the sample prepared in Example 2.

The rheology of these samples was tested and is reported in FIG. 2. The $T_g$ was lower than the control with no THF, but the $T_g$ values were all equivalent. The thermogravimetric analysis (TGA) of the samples was also analyzed and is shown in FIG. 3. The weight loss was in order at lower temperatures, and mostly in order at higher temperatures.

Example 3

Asphaltenes (extracted from SemMaterials Total Pen 30 asphalt) were mixed under ambient conditions with a polymer that was 100 parts by weight 50% Bis-(2-Hydroxypropyl) Aniline (BHPA) and 50% 2-Ethyl-1,3-Hexane Diol (EHD) (referred to as "EN8," obtained from Cytec), and 18.8 parts by weight 10-12% toluenediisocyanate (TDI) and 88-90% TDI end-capped polybutadiene (referred to as "EN4," obtained from Cytec), which when mixed together and cured are referred to as EN8. The respective quantities of each ingredient are shown in Table 3. The samples were cured for 5 hours (5 h) followed by 5 hours under vacuum (5 hVac) at 110° C.

TABLE 3

| Sample # | Asphaltene[A] | Asphaltene (g) | THF[A] | THF (g) | EN4 (g) | EN8 (g) |
|---|---|---|---|---|---|---|
| 1 | 0 | 0 | 12 | 2.00 | 12.63 | 2.37 |
| 2 | 1 | 0.15 | 12 | 2.00 | 12.50 | 2.35 |
| 3 | 2.5 | 0.37 | 14.3 | 2.50 | 12.31 | 2.31 |
| 4 | 5 | 0.75 | 19 | 3.50 | 12.00 | 2.26 |

[A]% by weight, based upon the total weight of the composition taken as 100% by weight.

Figure 4:
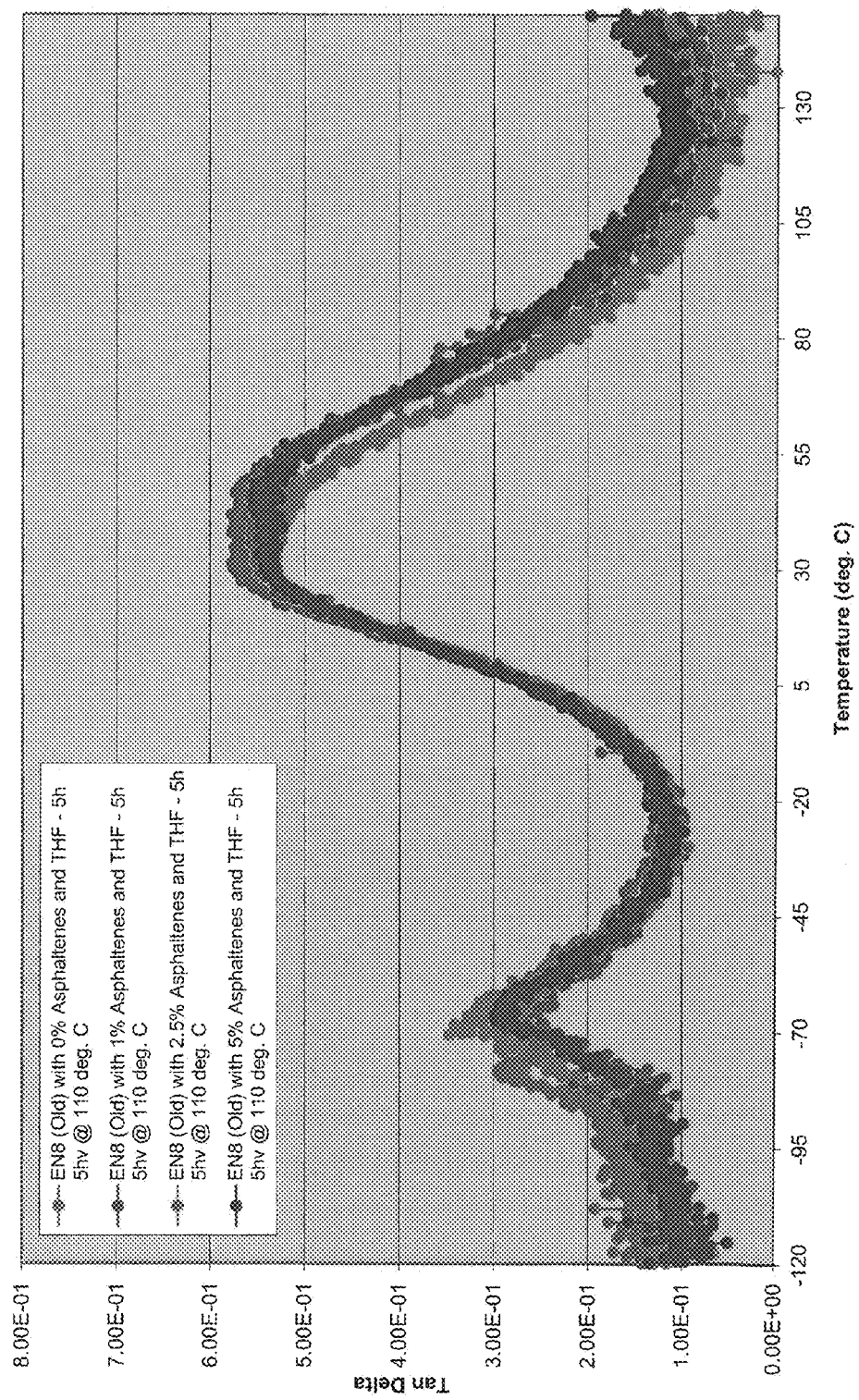
FIG. 4 is a graph depicting the rheology of the sample prepared in Example 3.

The rheology of these samples was tested and is reported in FIG. 4. There was no change in $T_g$ at any loading.

I claim:

1. A nano-composite consisting essentially of a polymer mixed with an asphaltene.

2. The nano-composite of claim 1, wherein said polymer comprises a polymer matrix, and said asphaltene is interspersed within said polymer matrix.

3. The nano-composite of claim 1, wherein said polymer comprises a polymer selected from the group consisting of epoxies, acrylics, urethanes, silicones, cyanoacrylates, vulcanized rubber, phenol-formaldehyde, melamine-formaldehyde, urea-formaldehyde, imides, esters, cyanate esters, allyl resins, and mixtures thereof.

4. The nano-composite of claim 1, wherein the weight ratio of polymer to asphaltene in said nano-composite is from about 60:40 to about 99.9:0.1.

5. The nano-composite of claim 1, wherein said nano-composite comprises from about 60% to about 99.9% by weight polymer, based upon the total weight of the nano-composite taken as 100% by weight.

6. The nano-composite of claim 1, wherein said nano-composite comprises from about 0.1% to about 40% by weight asphaltene, based upon the total weight of the nano-composite taken as 100% by weight.

7. The nano-composite of claim 1, wherein said asphaltene is only physically mixed with said polymer.

8. The nano-composite of claim 1, wherein said asphaltene is reacted with said polymer.

9. The nano-composite of claim 1, wherein said nano-composite comprises a plurality of asphaltenes.

10. The nano-composite of claim 1, wherein said asphaltene has an H/C ratio of less than about 1.40.

11. The nano-composite of claim 1, wherein said polymer is a crosslinked polymer.

12. A method of creating a nano-composite, said method comprising mixing an asphaltene with a polymer, wherein said nano-composite consists essentially of said polymer and said asphaltene.

13. The method of claim 12, wherein said polymer comprises a polymer matrix, and said mixing comprises interspersing said asphaltene within said polymer matrix.

14. The method of claim 12, wherein said polymer comprises a polymer selected from the group consisting of epoxies, acrylics, urethanes, silicones, cyanoacrylates, vulcanized rubber, phenol-formaldehyde, melamine-formaldehyde, urea-formaldehyde, imides, esters, cyanate esters, allyl resins, and mixtures thereof.

15. The method of claim 12, wherein the weight ratio of polymer to asphaltene in said nano-composite is from about 60:40 to about 99.9:0.1.

16. The method of claim 12, wherein said nano-composite comprises from about 60% to about 99.9% by weight polymer, based upon the total weight of the nano-composite taken as 100% by weight.

17. The method of claim 12, wherein said nano-composite comprises from about 0.1% to about 40% by weight asphaltene, based upon the total weight of the nano-composite taken as 100% by weight.

18. The method of claim 12, wherein said asphaltene is only physically mixed with said polymer.

19. The method of claim 12, wherein said asphaltene is reacted with said polymer during said mixing.

20. The method of claim 12, wherein said nano-composite comprises a plurality of asphaltenes.

21. The method of claim 12, wherein said asphaltene has an H/C ratio of less than about 1.40.

22. The method of claim 12, further comprising mixing a solvent with at least one of said polymer or said asphaltene.

23. The method of claim 22, wherein said solvent is selected from the group consisting of acetic acid, acetic acid anhydride, acetone, acetonitrile, benzene, iso-butanol, n-butanol, tert-butanol, carbon tetrachloride, chlorobenzene, chloroform, cyclohexane, cyclopentane, dichloromethane, dioxane, ethanol, ethyl acetate, ethylene dichloride, heptane, n-hexane, hydrochloric acid, methyl ethyl ketone, methanol, methyl tert-butyl ether, iso-propanol, n-propanol, pyridine, tetrahydrofuran, toluene, trifluoroacetic acid, water, dimethyl acetamide, dimethyl formamide, pentane, diethyl ether, dimethyl sulfoxide, ethyl ether, ethylene glycol, petroleum ether, and mixtures thereof.

24. The method of claim 12, wherein said mixing yields a mixture of said asphaltene and polymer, and further comprising heating said mixture.

25. The method of claim 24, wherein said heating causes crosslinking of said polymer.

26. The nano-composite of claim 1, wherein said polymer comprises an epoxy polymer.

27. The nano-composite of claim 1, wherein said nano-composite consists of said polymer, said asphaltene, and a residual amount of at least one solvent and/or a cross-linking catalyst.

28. The nano-composite of claim 1, wherein said nano-composite consists of said polymer, said asphaltene, and a residual amount of at least one solvent and/or a cross-linking catalyst.

29. A nano-composite comprising an epoxy polymer mixed with an asphaltene.

30. The nano-composite of claim 29, wherein said nano-composite consists essentially of said epoxy polymer and said asphaltene.

* * * * *